H. N. AND T. N. GARSON.
AUTOMOBILE CHASSIS.
APPLICATION FILED MAR. 15, 1922.

1,438,484.

Patented Dec. 12, 1922.

INVENTORS.

BY

ATTORNEY.

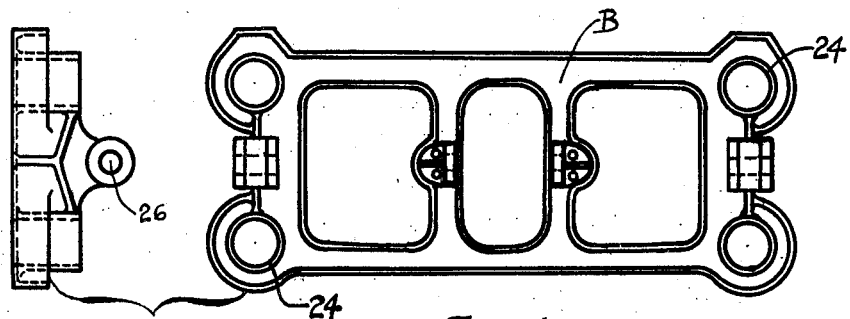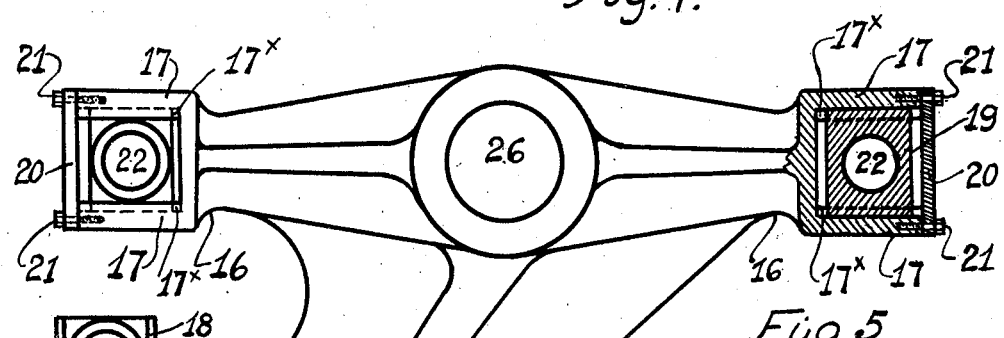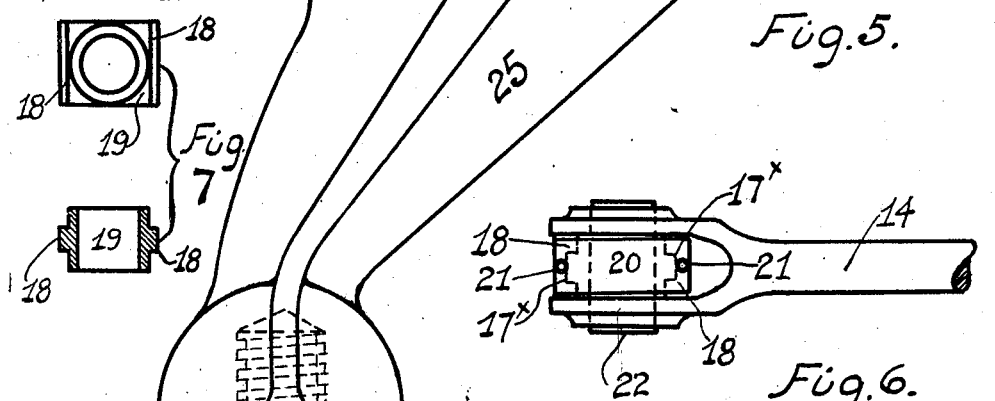

Patented Dec. 12, 1922.

1,438,484

UNITED STATES PATENT OFFICE.

HENRIK N. GARSON AND THORVALD N. GARSON, OF NEW YORK, N. Y.

AUTOMOBILE CHASSIS.

Application filed March 15, 1922. Serial No. 543,893.

*To all whom it may concern:*

Be it known that we, HENRIK N. GARSON, a subject of the King of Norway, and THORVALD N. GARSON, a citizen of the United States, and residents respectively of New York city, State of New York, and St. George, borough of Richmond, city and State of New York, have invented certain new and useful Improvements in Automobile Chassis, of which the following is a specification.

The purpose of the invention is to provide a truck or pleasure car chassis capable of carrying heavy loads, and of such design that driving shocks transmitted by the passage of the wheels over irregularities in the road surface will be largely absorbed. Further objects of the invenion will hereinafter appear.

The invention will be understood by reference to the accompanying drawings in which Fig. 1 is a diagrammatic plan view of a chassis embodying the improvements, and Fig. 2 is a side elevation of the same.

Fig. 4 illustrates the rear transverse frame member, in side and front elevation.

Fig. 5 is a side elevation, partly in section of a rear rocker arm.

Fig. 6 is a sectional plan view of one of the spring actuating rods, illustrating diagrammatically its connections with a rocker arm.

Fig. 7 illustrates in elevation and in sectional plan one of the slide-bushings disposed in practice intermediate a spring actuating rod and its appropriate rocker arm.

In the present construction, a set of two load carrying springs and a set of two bumper springs are provided for each wheel. These springs are disposed within two parallel vertically spaced tubes at each side of the chassis and in themselves constituting the side chassis frame members. The stresses are distributed over the said side frame members inasmuch as the load carrying springs in the lower tube are arranged at the opposite ends thereof, the bumper springs being intermediate, whereas in the upper tube the load carrying springs are intermediate and the bumper springs are at the opposite ends of the tube.

Figure 1:
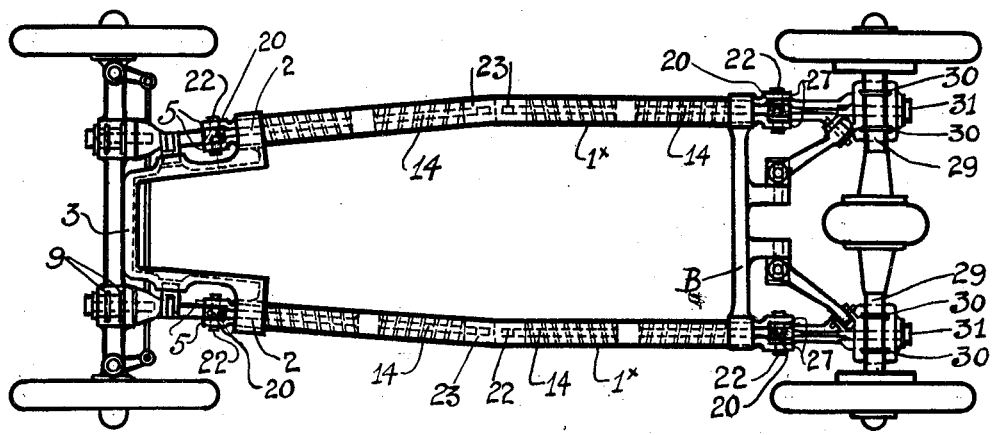
Figure 2:
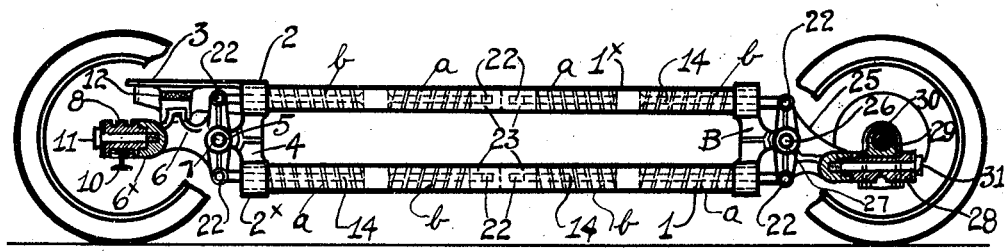
Figure 3:
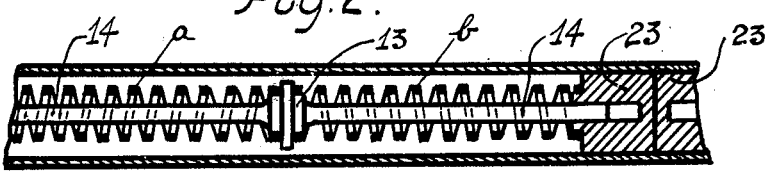
Fig. 3 is a fragmentary longitudinal sectional view of one of the tubular frame members enclosing the load-carrying and bumper springs.

Referring to Figs. 1 to 3 of the drawings, it will be seen that the chassis comprises side frame members consisting of a lower tube 1 and an upper tube $1^x$. The side frame members are rigidly connected by means of front and rear cross frame members. The front cross frame member 3 is U-shaped, a depending extension being provided at each side, said extension being provided with a sleeve 2 for reception of the upper tube $1^x$ and with a second sleeve $2^x$ for the reception of the lower tube 1. Each lower sleeve $2^x$ is connected to its appropriate upper sleeve 2 by means of a web 4. This web is formed with forwardly projecting lugs 5 between which is disposed the appropriate front rocker 6, the lugs being apertured to receive pivot stud 7 for said rocker. Each front rocker 6 is formed with a cup-like end $6^x$ which receives the annular end of a trunnion 8, the trunnion being rigidly secured by straps 9 to the front axle 10. A stud 11 is loosely fitted within a suitable bearing aperture formed in the trunnion and is threaded within the cup-like end $6^x$ of the rockers. By this means the front axle is so mounted as to be capable of oscillation alternately upon each stud 11. Thus when one of the wheels passes over an obstruction, the axle and the rocker arm nearest the wheel will be moved upwardly therewith; the opposite end of the axle, however, will merely oscillate upon the stud 11 at that end, as an axis. The rear axle is similarly mounted, as will hereinafter appear, and in this manner the transmission of torsional stresses and shock to the frame is largely reduced.

Each front rocker is formed with an upwardly projecting lug disposed beneath a cushion 12 secured to frame 3 and thus providing a limit-stop for the rocker.

It will be seen that each spring actuating rod 14 is formed intermediate its length with a head 13 and that the head is adapted to engage two springs, a load carrying spring a and a bumper spring b these springs being disposed within the appropriate side frame tube. The outer end of each spring-actuating rod is forked (Fig. 6) to embrace the appropriate leg 16 of its rocker. The said leg also is formed with a forked end, the opposed walls 17 of which are channeled at 17× to receive the ribs 18 of a slide-bushing 19. The forks of the spring actuating rod are apertured to receive a stud 22 which passes through the slide bushing and thus forms the primary connecting unit. The extent of movement of bushing 19 is limited by a cap 20 secured to the rocker by screws 21. By this construction compensation is provided for the slight variations in distance between the axis of the rocker and the end of the rod due to the arcuate movements of the rocker, thus avoiding the necessity of a link intermediate the rocker and the rod permitting lateral movement of the rod.

The inner end of each spring-actuating rod is guided within an axial aperture 22 formed in an appropriate internal reinforcing block 23, the said blocks being disposed within the tubular frame members substantially centrally thereof as shown in Figs. 1 and 2.

The tubular frame members at their rear ends are rigidly connected by means of the cross frame member B illustrated in Fig. 4 being received within the sleeves 24. The connections between the rear spring actuating rods and the rear rockers 25 are the same as those in the front of the chassis and as illustrated in Figs. 5 and 6. Each rear rocker is fulcrumed at 26 between lugs 27 projecting from the cross frame member B, and is formed with a cupped end to receive the annular end of a trunnion 28 secured to the rear axle housing 29, in underslung position, by means of the straps 30. A stud-screw 31 passes through the bearing aperture of the trunnion, in each case, and is threaded within the cupped end of the rocker. Thus the rear axle may oscillate upon the studs as hereinbefore described with respect to the front axle and its connections.

What we claim is:

1. In an automobile chassis, a frame including two horizontally arranged and vertically spaced tubular side frame members, supporting wheels, a spiral load carrying spring horizontally supported by each side frame member, a rocker mounted on the frame and connected to a wheel, and an operative connection between said rocker and each of said springs.

2. In an automobile chassis, a frame comprising two tubular horizontally arranged and vertically spaced side members, a load carrying spring horizontally supported by each side frame member, supporting wheels, and connecting means intermediate a wheel and each of said springs, including a rocker mounted on the frame.

3. In an automobile chassis, a frame, two tubular horizontally arranged and vertically spaced members at each side of the frame, a coiled load carrying spring within each tubular member, supporting wheels, and connecting means intermediate a wheel and each of said springs, including a rocker mounted on the frame.

4. In an automobile chassis, a frame comprising side members, each side member consisting of an upper and a lower tube, a wheel, a rocker carried by the frame, a spiral load carrying spring within each tube, rods within the coils of the load carrying springs and each having a head engaging its appropriate spring, and a rocker mounted on the frame and having connections with the rods and with the wheel.

5. In an automobile chassis, supporting wheels, a frame comprising side members each consisting of an upper and a lower tube, a spiral load carrying spring within each tube, a front and rear cross frame members, a plurality of rods each within the coils of a load carrying spring and having a head engaging said spring, and a plurality of rockers, each rocker being pivoted to the frame and being connected to two of said rods and to a wheel.

6. In an automobile chassis, supporting wheels, a frame comprising side members each consisting of an upper and a lower tube, a spiral load carrying spring within each tube, a front and rear cross frame members each formed with four spaced sleeves to receive the tubes, a plurality of rods each within the coils of a load carrying spring and having a head engaging said spring, and a plurality of rockers, each rocker being pivoted to the frame and being connected to two of said rods and to a wheel.

7. In an automobile chassis, supporting wheels, a frame comprising side members each consisting of an upper and a lower tube, a front and rear cross frame members, a plurality of rods, each within a tube and having a head intermediate it's length, a load carrying and a bumper spring within the tube and encircling said rod one on each side of said head, and a plurality of rockers, each rocker being pivoted to the head and being connected to two of said rods and to a wheel.

8. An automobile chassis of the construction specified in claim 7, in which the rocker is pivoted intermediate its length to the frame, and its connection with each rod permits relative movement between the two.

9. An automobile chassis of the construction specified in claim 8 in which the connection between the rod and rocker comprises a block slidable within a seat formed in the rocker.

10. An automobile chassis of the construction specified in claim 7 in which the rocker is formed with three arms radiating from a central pivotal point for connection to the frame, one of said arms being adapted for pivotal connection with an axle and each of the remaining two arms being adapted for connection with a rod.

In testimony whereof, we have signed our names to this specification in the presence of two subscribing witnesses.

HENRIK N. GARSON.
THORVALD N. GARSON.

Witnesses:
W. LEE HELMS,
F. H. LOGAN.